Nov. 8, 1927.
W. H. HIMES
1,648,346
SPRING SHACKLE
Filed Sept. 13, 1920
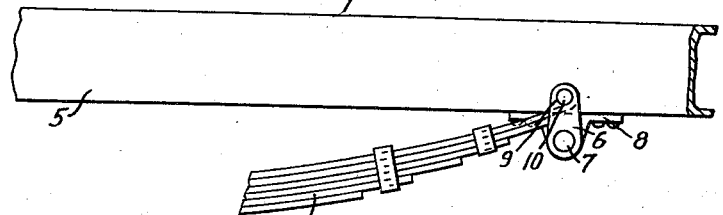
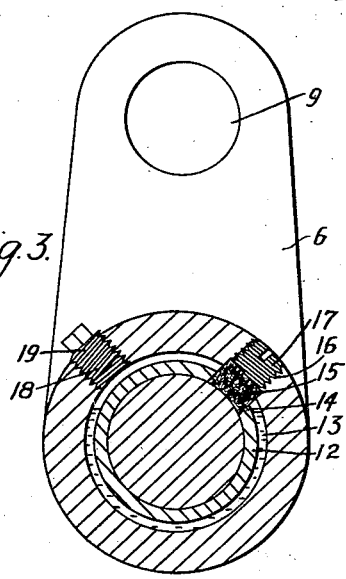
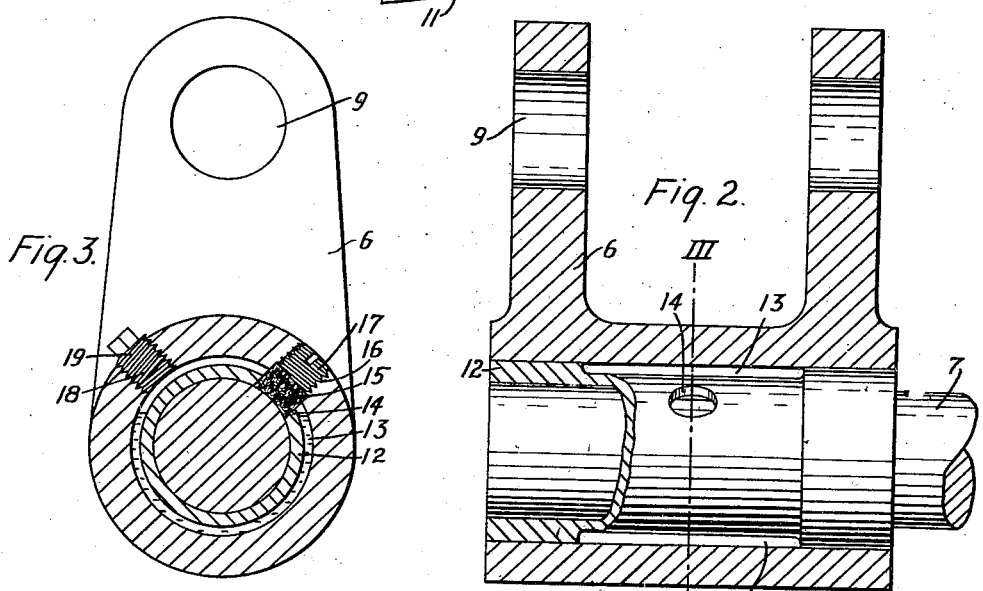
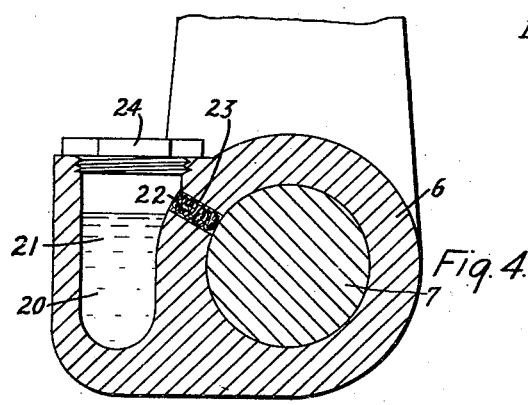
INVENTOR
Walter H. Himes
BY
Fred. A. Lind
ATTORNEY Patented Nov. 8, 1927.

1,648,346

UNITED STATES PATENT OFFICE.

WALTER H. HIMES, OF PITTSBURGH, PENNSYLVANIA.

SPRING SHACKLE.

Application filed September 13, 1920. Serial No. 409,911.

My invention relates to bearings and relates particularly to the lubrication of spring shackle bearings employed on movable vehicles such, for example, as automobile trucks.

The object of my invention is to provide a system of lubrication whereby bearings of the above indicated character shall be provided with lubricant only when said vehicle is in motion.

Heretofore, it has been customary in the manufacture of spring shackles to provide the bearings surfaces thereof with lubricant by means of oil or grease cups, or by means of an oil wick having one end disposed in engagement with the bearing surface and having the other ends disposed within a reservoir of lubricant.

The use of oil cups is objectionable for the reason that the operation thereof is not automatic, that is, if the operator of the machine neglects to turn the oil cup, the bearing receives no oil whatsoever. Also, the amount of lubrication received therefrom is not properly distributed, that is, it provides an excess of oil for a short time, after which no oil is provided, so that the bearing is generally either flooded or dry, being provided with the proper amount of oil for but a small portion of its time of use.

The objection to having a wick extend from the bearing surface to a body of lubricant is that the wick continually feeds oil irrespective of whether or not the vehicle on which the bearing is mounted, moves, thus flooding the bearing and draining the reservoir when the machine stands idle for any length of time.

The use of grease for lubrication, either by the use of grease cups or otherwise, is objectionable for the reason that grease obeys no laws of capillary attraction and the grease therefore does not move to any surface to which it is not forced. Instead, the grease tends to pack into corners and escape through the threads of the grease cup, or hardens in the passage ways provided therefor, preventing any lubricant whatever from reaching the bearing surfaces.

By my invention, I have provided a means whereby the bearing surface is provided with a small quantity of lubricant which is renewed only when the machine on which it is mounted is in motion so that the bearing is automatically provided with oil when necessary, and flooding of the bearing when the machine is idle is prevented.

For a better understanding of my invention, reference may now be had to the accompanying drawings of which Figure 1 is a side elevational view of a portion of an automobile truck provided with a spring shackle, embodying a bearing constructed in accordance with my invention.

Fig. 2 is a cross-sectional view of the shackle shown in elevation in Fig. 1.

Fig. 3 is a cross-sectional view taken along the lines III—III of Fig. 2.

Fig. 4 is a cross-sectional view of a slightly modified form of my invention.

In the drawings, an automobile truck frame 5 is provided with spring shackle 6 rotatably mounted upon an axle 7, which in turn is fixedly secured to the frame 5 by means of a support 8. The upper end of the shackle 6 is provided with openings 9 adapted to receive a bolt or pin 10, which, in turn, passes through the eye of a spring 11, supported from the wheel axle, not shown.

In the form of my invention illustrated in Figs. 2 and 3, the shaft 7 is spaced from the shackle body 6 by means of a bushing 12. The shaft 7 is fixedly mounted upon the support 8, and the shackle body 6 is oscillatably mounted on the shaft 7, but is spaced therefrom by means of the renewable bushing 12, as is customary in the art. The central part of the outer periphery of the bushing 12 is removed, forming an annular chamber 13, which serves as an oil reservoir. The bushing 12 is pressed into the shackle body 6 and moves therewith. The bushing 12 is provided with an opening 14, in the reduced portion thereof within which a short lubricant absorbent wick 15 is disposed. The wick is placed in position when assembled, and may be removed for purposes of inspection or replacement, through an opening 16 in the shackle body 6, in alinement with the opening 14 in the bushing. The opening 16 is threaded and is normally closed by a threaded plug 17.

The shackle body is also provided with a threaded opening 19. This opening is for filling the lubricant reservoir. It will be noted that the level of the oil in the reservoir 13 is below the wick 15, so that the wick retains a relatively small supply of oil in engagement with the bearing surfaces at all times, but that this small supply is replenished only upon bodily movement of the bearing or shackle body, which agitates the oil. Thus, when the truck remains idle the bearing receives no oil, and the main body of lubricant cannot drain away. Also, the bearing receives a fresh supply of oil only when it needs it, that is, when the truck is in motion, at which time the oil is automatically supplied to the bearing.

In the structure shown in Fig. 4, a reservoir 20, containing a body of liquid lubricant 21, is disposed on the side of the shackle body. A wick 22 is disposed within an opening 23 in the shackle body 6 extending to the bearing surfaces. The wick is disposed above the normal level of the liquid in the reservoir. The reservoir is closed by means of a threaded plug 24, which may be removed to refill the oil reservoir or to inspect the wick 22.

It will be apparent from the foregoing description that by my invention I have provided a lubricating device which is automatic and which eliminates the continuous wastage of oil which has been customary in such devices.

My invention is applicable to any type of bearing in which a bearing sleeve or bushing remains relatively stationary and which is bodily movable with the structure on which it is mounted, or is subject to vibration. My invention is, therefore, not limited to spring shackles, but to any type of bearing of the class above described.

While I have shown but two forms of my invention, and have described in detail but a single application thereof, it will be obvious to those skilled in the art that it is not so limited, but that various minor modifications and changes may be made therein without departing from the spirit and scope thereof, and I desire, therefore, that only such limitations be imposed thereon as are set forth in the appended claims.

I claim as my invention:

1. An axle bearing comprising a main housing, a bearing sleeve disposed therein, an annular lubricant chamber disposed outside of and adjacent to said sleeve, and a lubricant absorbent wick disposed partially within said sleeve and partially within said lubricant chamber so as to be supplied with lubricant only by the splashing thereof.

2. In combination, a shackle body, a bushing fixedly mounted therein having an internal bearing surface and provided with a passageway extending therethrough and in communication with said bearing surface, and a body of liquid lubricant disposed intermediate said shackle body and bushing, the normal level of said lubricant being below said passageway, and a lubricant absorbent wick disposed within the passageway in said bushing.

3. In combination, a shackle body, a bushing fixedly mounted therein, a portion of the periphery of said bushing being removed to provide a substantially arcuate lubricant chamber intermediate said shackle body and said bushing, said bushing being provided with an opening therethrough, a lubricant absorbent wick disposed within said opening, a body of oil disposed within said chamber, the normal level of said body of oil being below said opening.

In testimony whereof, I have hereunto subscribed my name this 11th day of September, 1920.

WALTER H. HIMES.